June 10, 1924.
Y. MIYASAKI
BUMPER
Filed Sept. 26, 1923    2 Sheets-Sheet 1
1,497,222
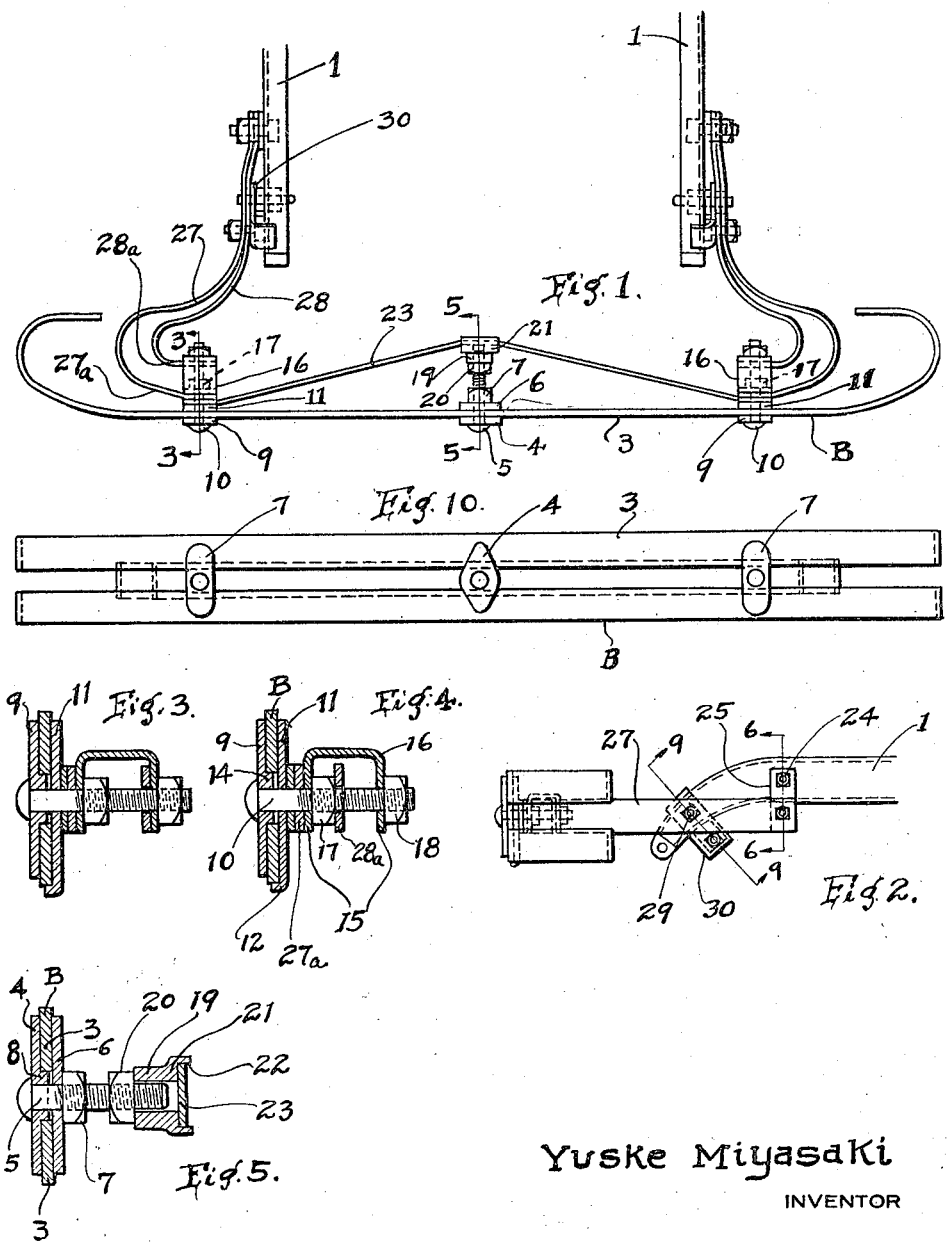
Yuske Miyasaki
INVENTOR
Watson E. Coleman
ATTORNEY June 10, 1924.
Y. MIYASAKI
BUMPER
Filed Sept. 26, 1923
1,497,222
2 Sheets-Sheet 2
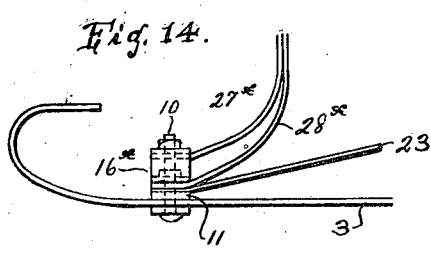
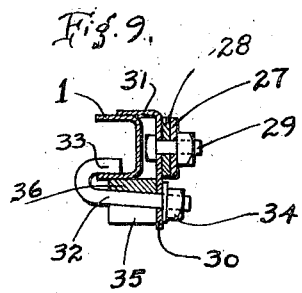
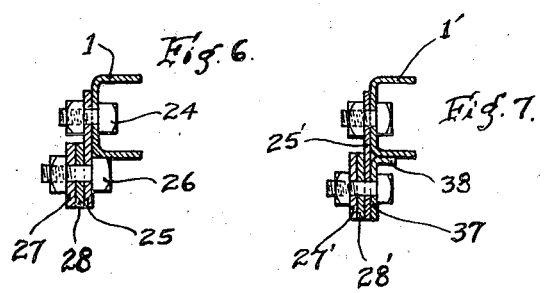
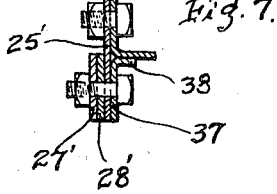
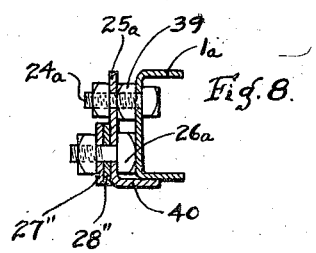
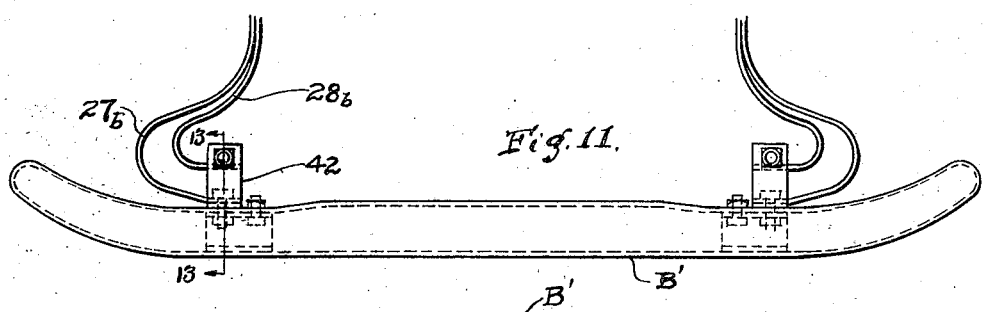
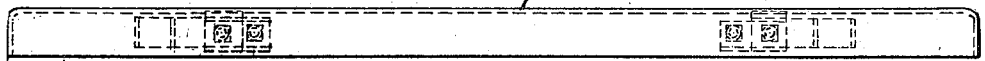
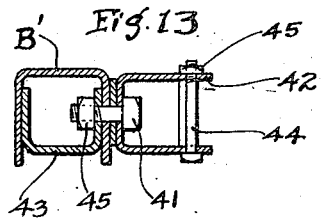
Yuske Miyasaki
INVENTOR
BY Watson E. Coleman
ATTORNEY Patented June 10, 1924.

1,497,222

UNITED STATES PATENT OFFICE.

YUSKE MIYASAKI, OF CLEVELAND, OHIO.

BUMPER.

Application filed September 26, 1923. Serial No. 664,960.

*To all whom it may concern:*

Be it known that I, YUSKE MIYASAKI, a subject of the Emperor of Japan, residing at Cleveland, in the county of Cuyahoga and State of Ohio, have invented certain new and useful Improvements in Bumpers, of which the following is a specification, reference being had to the accompanying drawings.

This invention relates to certain improvements in bumpers and has relation more particularly to a device of this general character especially designed and adapted for use in connection with motor vehicles and it is an object of the invention to provide a novel and improved device of this general character comprising a bumper proper of rigid construction to withstand impact together with springs associated therewith to absorb the shock.

It is also an object of the invention to provide a novel and improved device of this general character which will offer maximum resistance to impact with the use of a minimum amount of material.

An additional object of the invention is to provide a novel and improved device of this general character wherein the supporting means therefor comprise a plurality of springs at each supporting point, said springs providing a multiple stage compression permitting one of the springs, preferably the outer spring, to be highly flexible to completely absorb minor impact but when subjected to major impact the springs cooperate in a manner to materially increase the resistance whereby to absorb such major impact.

Furthermore it is an object of the invention to provide a novel and improved device of this general character of a truss type consisting of a chord, tie bar and strut so that when an impact comes near the center of the bumper proper the chord and strut will be subjected to compression and the tie bar to tension whereby it is possible to provide a rigid and pronouncedly strong bumper by employing a comparatively small amount of material and also whereby it is possible to use common steel instead of high grade steel.

Another object of the invention is to provide a novel and improved device of this general character of rigid construction to withstand impact and wherein the shock is absorbed by springs, said springs being highly flexible horizontally but rigid vertically.

The invention consists in the details of construction and in the combination and arrangement of the several parts of my improved bumper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan illustrating a bumper constructed in accordance with an embodiment of my invention and in applied position;

Figure 2 is a fragmentary view in side elevation of the structure as illustrated in Figure 1;

Figure 3 is a sectional view taken substantially on the line 3—3 of Figure 1;

Figure 4 is a view similar to Figure 3 but showing the structure under compression;

Figure 5 is a sectional view taken substantially on the line 5—5 of Figure 1;

Figure 6 is a sectional view taken substantially on the line 6—6 of Figure 2;

Figure 7 is a sectional view illustrating a modified arrangement for connection of the springs to a side bar;

Figure 8 is a sectional view illustrating another embodiment of my invention for connecting the springs to a side bar;

Figure 9 is a sectional view taken substantially on the line 9—9 of Figure 2;

Figure 10 is a fragmentary elevational view of the bumper as illustrated in Figure 1;

Figure 11 is a view in top plan illustrating a bumper constructed in accordance with another embodiment of my invention;

Figure 12 is a view in front elevation of the bumper proper as illustrated in Figure 11, certain of the parts associated therewith being indicated by broken lines;

Figure 13 is a sectional view taken substantially on the line 13—13 of Figure 11;

Figure 14 is a fragmentary view in top plan illustrating a bumper constructed in accordance with another embodiment of my invention;

As disclosed in the accompanying drawings, 1 denotes the side bars of the chassis frame of an automobile or the like, said bars being of a conventional type, only one end portion or horn of said bars being herein disclosed.

The bumper B proper comprises two elongated members 3 arranged one above the other and in desired spaced relation, said members also constituting the front chord of the structure. The extremities of the members 3 may be returned as indicated.

Overlying the outer faces of the members 3 at the central portion thereof is a holding plate 4 through which is disposed a bolt 5. The bolt 5 is of a length to extend between the members 3 and also through a rear holding plate 6. Threaded upon the bolt 5 and engaging the rear plate 6 is a nut 7 whereby the plates 4 and 6 may be caused to have requisite engagement with the members 3 and thereby provide means for maintaining said members in assembled relation. The opening in the outer plate 4 is surrounded by the inwardly disposed boss 8 which snugly engages between the members 3 whereby the requisite maintenance of the plate 4 is assured.

A front holding plate 9 also overlies the members 3 at each side of the plate 4 and preferably at a point outwardly of but in relatively close proximity to the line of the adjacent side bar 1 of the chassis. Disposed through each plate 9 is the bolt 10 which is also directed through a rear holding plate 11. The plate 11 is provided at its lower extremity with a forwardly directed lip or flange 12 which underlies and contacts with the lower member 3 whereby the plate 11 is effectively maintained in assembled relation. The opening in the plate 9 through which the bolt 10 is directed is also provided with an outstanding boss 14 snugly engaging between the members 3 to assure the proper maintenance of the plate 9.

The bolt 10 is also disposed through the depending side members 15 of a bracket 16, said bracket 16 being in the form of an inverted U. Threaded upon the bolt 10 and engaging with the internal face of the inner side member 15 is a holding nut 17 and also threaded upon said bolt 10 and engaging with the outer face of the second side member 15 is the clamping nut 18.

Loosely engaged upon the inner or free end portion of the bolt 5 is a sleeve 19 with which is associated a nut 20 threaded upon the bolt 15. The outer end of the sleeve 19 is provided with a head 21 provided in its outer face with a groove or channel 22 disposed in the same general direction as the members 3 of the bumper B proper. Seating within the groove 22 is the central portion of a rear chord or tie bar 23, a bolt 10 being disposed through each of the extremities thereof whereby the same is effectively connected with the members 3. The bolt 5 and the parts concomitant thereto provide a strut and by proper adjustment of the nut 20, the sleeve 19 may be moved in a direction lengthwise of the bolt 5 to regulate or vary the tension of the rear chord or tie bar 23 as the necessities of practice may require.

Bolted or otherwise secured as at 24 to each of the side bars 1 is a plate 25 of a length to extend a desired distance below the adjacent portion of the bar 1 and bolted or otherwise secured as at 26 to the lower portion of said plate 25 are the overlapping extremities of the springs 27 and 28. The overlapping portions of the springs 27 and 28 also overlie and are bolted or otherwise secured as at 29 to a plate 30. The upper portion of the plate is provided with an inturned flange 31 which overlies the adjacent portion of the side bar 1 at a point in close proximity to its outer or free end and more particularly the lower portion thereof. This plate 30 is of a length to extend below the bar 1 and has disposed therethrough a bolt 32 provided with a hook 33 engaging over the lower flange of the side bar 1, said bar being herein disclosed of channel type with its open face inwardly disposed.

Threaded upon the bolt 32 for coaction with the plate 30 to effect the desired clamping action on the bar 1 is the nut 34. The bolt 32 is also engaged within a channel or groove 35 produced in the lower face of a block 36 underlying and in contact with the side bar 1 and also in contact with the inner face of the adjacent portion of the plate 30.

The springs 27 and 28 outwardly of the connection afforded by the bolt 29 are disposed outwardly on predetermined curvatures and gradually separated. The outer end portions of the springs 27 and 28 are then disposed inwardly as at 27$^a$ and 28$^a$, the free extremity of the portion 27$^a$ being anchored or connected to the bumper B proper by a bolt 10 passing therethrough while the free extremity of the portion 28$^a$ has the bolt 10 loosely disposed therethrough.

The portion 27$^a$ possesses greater flexibility than the portion 28$^a$ so that slight impact upon the bumper B will be absorbed thereby. However, upon major impact the bumper B will cause the nut 17 to come into contact with the portion 28$^a$ whereby resistance to such major impact will be offered by both of the springs 27 and 28. It is to be noted that the springs 27 and 28 and more particularly the portions 27ᵃ and 28ᵃ thereof are flexible in a horizontal direction but the connection of such springs with the side bars 1 is such as to render the same substantially rigid in a vertical direction. When thrust is imposed upon the plate 25 the head of the bolt 26 contacts with the under face of the adjacent side bar 1 thereby effectively preventing back swing. Such back swing is also prevented by the plate 30 and the parts associated therewith.

As illustrated in Figure 7 the depending portion of the plate 25' to which the springs 27' and 28' are connected is reinforced by the plate 37 overlying the inner face of said depending portion of the plate 25' and provided at its upper end with an inwardly disposed flange 38 underlying the associated side bar 1' and in contact therewith.

As illustrated in Figure 8, the plate 25ᵃ is clamped to the bar 1ᵃ by the bolt 24ᵃ but is spaced from the bar 1ᵃ by the nut 39 threaded upon the bolt 24ᵃ. The lower portion of the plate 25ᵃ is continued by an inwardly disposed extension or flange 40 and underlies and contacts with the bar 1ᵃ. The connecting bolt 26ᵃ for the springs 27" and 28" is disposed only through the plate 25ᵃ and the adjacent portions of said springs.

The tie bar 23 together with the strut as afforded by the bolt 5 and its associated parts provides means whereby when an impact comes near the center of the bumper B proper it will be absorbed by the springs 27 and 28 in view of the fact that said tie bar and strut serve to maintain the bumper B proper rigid and of increased strength. In view of this, the use of the tie bar 23 and strut permits the members 3 to be made of a lower grade of material, such as steel, instead of high grade material.

In the embodiment of my invention as particularly illustrated in Figures 11, 12 and 13 the bumper B' is of channel formation with its open face downwardly disposed. The outer end portion of the spring 27ᵇ is held to the bumper B' by a bolt 41 directed through the base portion of a substantially U-shaped bracket 42 and the adjacent flange or side of the bumper B' proper and also through a side flange of a bracing bracket 43 snugly engaged within the bumper B'. The bracing bracket 43 is substantially U-shaped in form as particularly illustrated in Figure 13. The bracket 42 is also substantially U-shaped in form and with its side members rearwardly disposed and the extremities thereof supports a bolt 44 which bridges the space between said side members. The free extremity of the spring 28ᵇ is freely disposed through the brackets 42 inwardly of the bolt 44. The bolt 41 together with the bolt 44 have engaged therewith the holding nuts 45.

In Figure 14 I illustrate an embodiment of my invention wherein the springs 27ˣ and 28ˣ have their forward portions disposed outwardly and substantially separated with the extremities thereof coacting with the bracket 16ˣ in the same manner as hereinbefore described with respect to the springs 27 and 28 and the associated bracket 16.

From the foregoing description it is thought to be obvious that a bumper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising, in combination, a bumper, supporting means associated with each end portion of the bumper, each of said means comprising a plurality of springs disposed in the same general direction, portions of said springs adjacent to the bumper being spaced apart, and means for securing said springs to the bumper, said springs coming one in contact with the other and acting in unison under compression.

2. A device of the class described comprising, in combination, a bumper, supporting means associated with each end portion of the bumper, each of said means comprising a plurality of springs disposed in the same general direction, portions of said springs adjacent to the bumper being spaced apart, and means for securing said springs to the bumper, said springs coming one in contact with the other and acting in unison under compression, the connection of said springs with the bumper being rigid, the remainder of said springs serving as a sub-support for the bumper.

3. A device of the class described comprising, in combination, a bumper, springs associated with said bumper, said bumper consisting of front and rear chord members spaced apart and meeting at points adjacent to the springs, bracing means for said chord members, and means for securing the device to a vehicle, said bracing means being adjustable to take up slack in the rear member and to subject said rear chord member to tension under impact.

4. In combination with the side rail of a chassis frame, a bumper, a bracket, a rod disposed through the bracket and provided with a hook engaging the side rail, a block interposed between the rod and the side rail, springs operatively engaged with the bracket and the bumper, and means to prevent back swing of the bracket about the rod as a center when the bumper is subjected to thrust.

5. A device of the class described comprising, in combination, a bumper, a plurality of springs separable from the bumper, said bumper consisting of front and rear chord members spaced apart, means for securing the springs to the rear member and the front chord member, bracing means coacting with the chord members, said front chord member consisting of two members extending beyond the springs, and means for securing said members to the springs and brace.

6. A device of the class described, comprising, in combination, a bumper, springs separable from said bumper, said springs being bent outwardly and then inwardly and arranged in pairs, the outwardly and inwardly bent portions being spaced apart, means to secure the outer spring to the bumper, said springs coming in contact one with the other and acting in unison under compression, and means for securing the springs to a vehicle.

7. A device of the class described comprising, in combination, a bumper, springs separable from said bumper, said springs being bent outwardly and then inwardly and arranged in pairs, the outwardly and inwardly bent portions being spaced apart, means to secure the outer spring to the bumper, said springs coming in contact one with the other and acting in unison under compression, and means for securing the springs to a vehicle, the connection of the outer spring to the bumper being rigid.

8. A device of the class described comprising, in combination, a bumper, springs separable from said bumper, said springs being bent outwardly and arranged in pairs, the springs of each pair being arranged one inwardly of the other, means to secure the inner springs to the bumper, said springs coming in contact one with the other and acting in unison under compression, the outer spring serving as a support for the bumper.

In testimony whereof I hereunto affix my signature.

YUSKE MIYASAKI.